Figure 1:
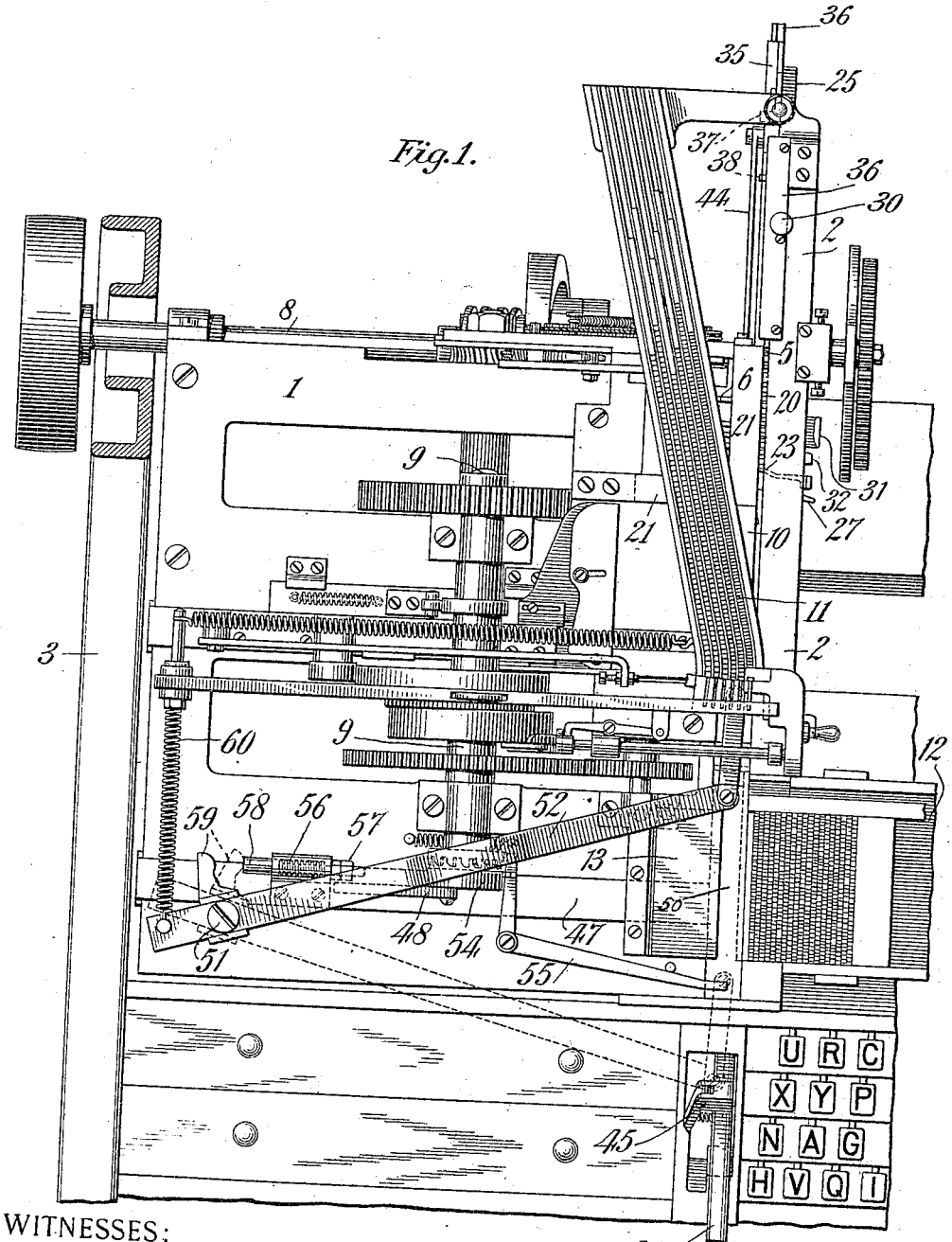

No. 839,504. PATENTED DEC. 25, 1906.
F. McCLINTOCK.
MACHINE FOR JUSTIFYING TYPE.
APPLICATION FILED FEB. 11, 1904.

5 SHEETS—SHEET 1.

WITNESSES:
C. E. Ashley
Henry Thrush

INVENTOR
Frank McClintock

No. 839,504. PATENTED DEC. 25, 1906.
F. McCLINTOCK.
MACHINE FOR JUSTIFYING TYPE.
APPLICATION FILED FEB. 11, 1904.

5 SHEETS—SHEET 2.

WITNESSES:
C. E. Ashley
Henry Thrush

INVENTOR
Frank McClintock

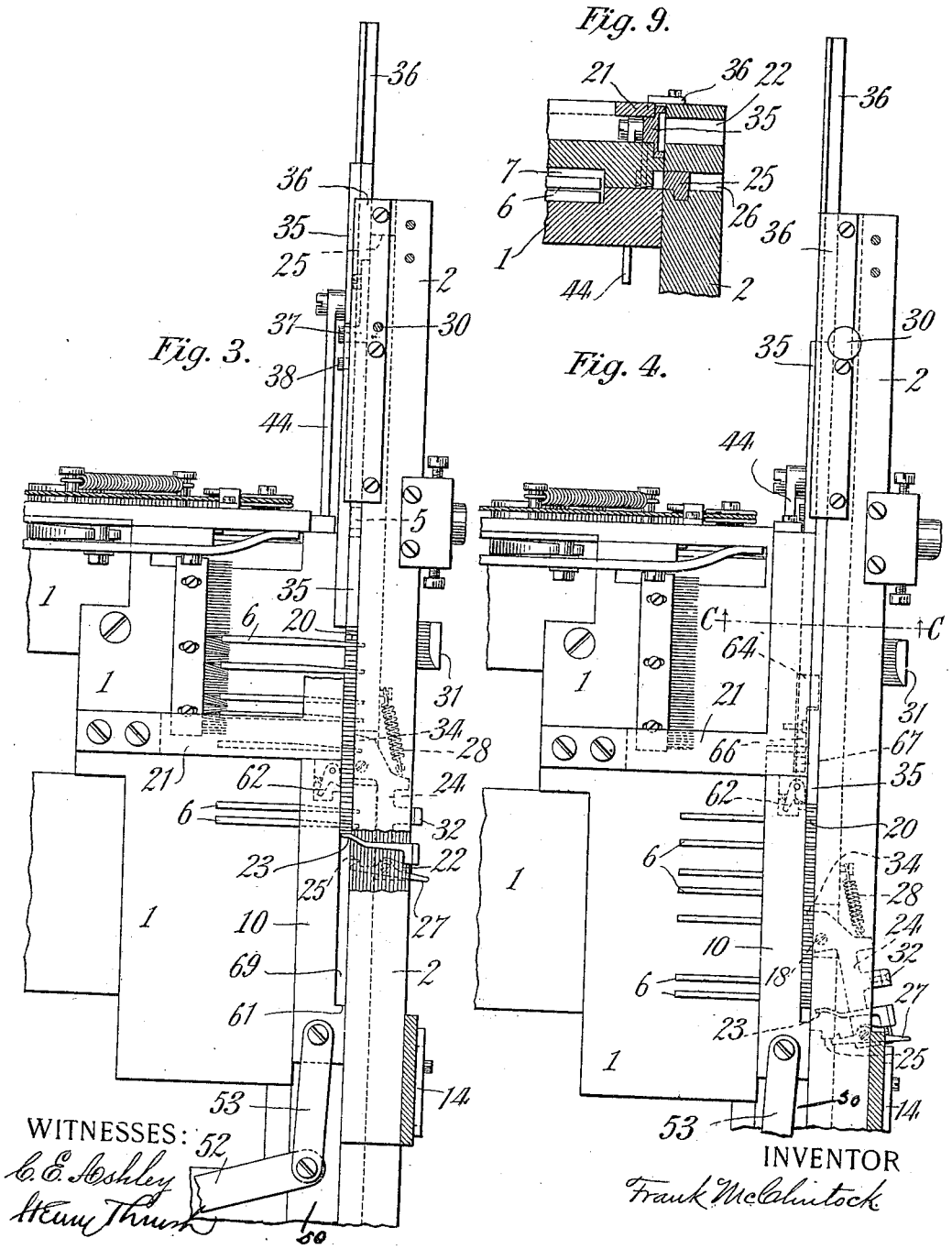

No. 839,504. PATENTED DEC. 25, 1906.
F. McCLINTOCK.
MACHINE FOR JUSTIFYING TYPE.
APPLICATION FILED FEB. 11, 1904.
5 SHEETS—SHEET 4.
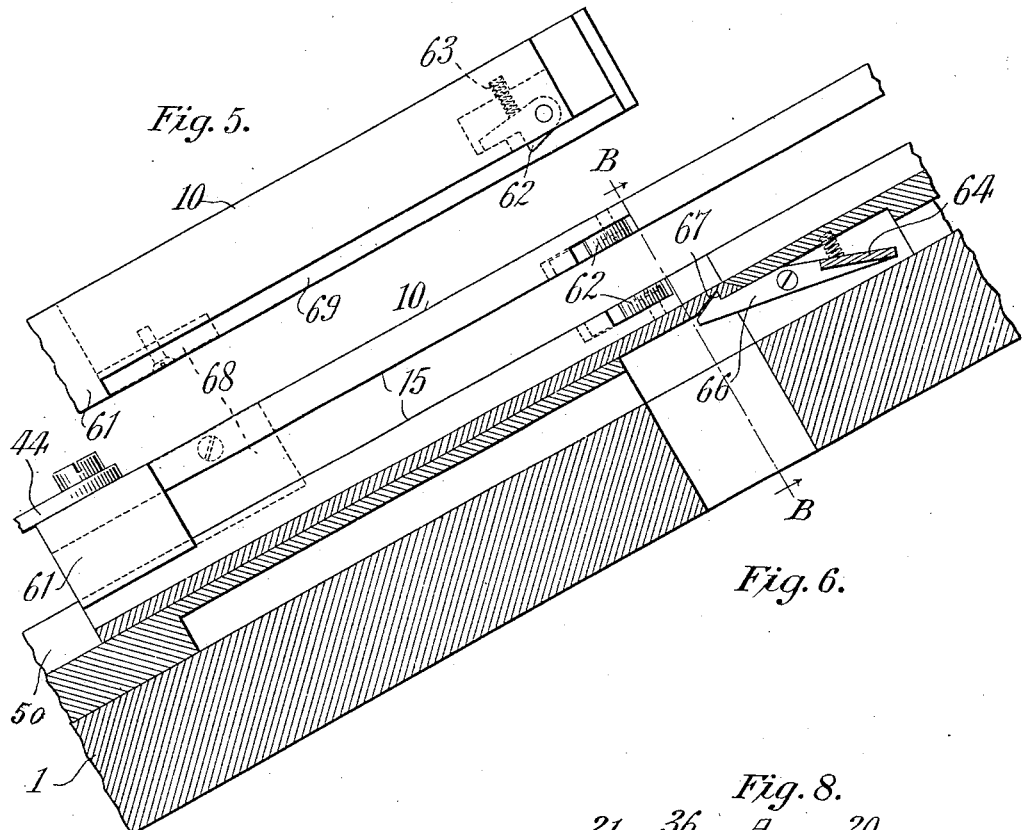
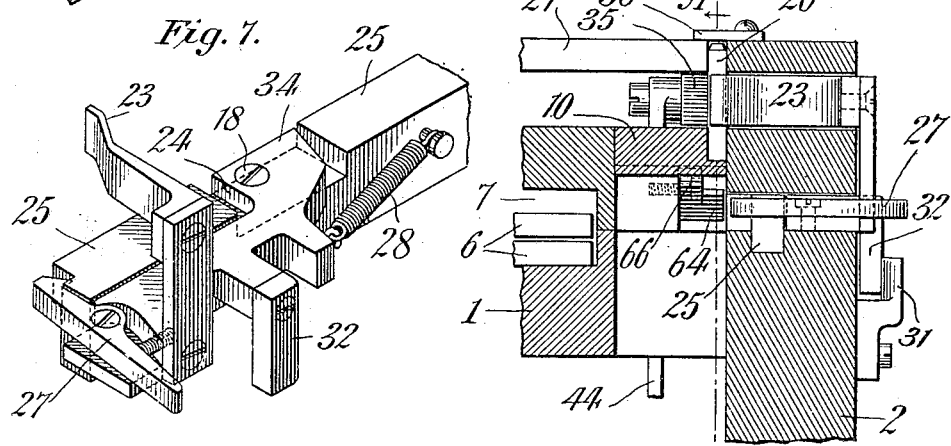
WITNESSES: INVENTOR
C. E. Ashley Frank McClintock
Henry Thrush

UNITED STATES PATENT OFFICE.

FRANK McCLINTOCK, OF MOUNT VERNON, NEW YORK, ASSIGNOR, BY MESNE ASSIGNMENTS, TO ADAM G. NORRIE AND WALTER E. DRUMMOND, OF NEW YORK, N. Y.

MACHINE FOR JUSTIFYING TYPE.

No. 839,504.     Specification of Letters Patent.     Patented Dec. 25, 1906.

Application filed February 11, 1904. Serial No. 193,075.

*To all whom it may concern:*

Be it known that I, FRANK McCLINTOCK, a citizen of the United States, and a resident of Mount Vernon, in the county of Westchester and State of New York, have invented certain new and useful Improvements in Machines for Justifying Type, of which the following is a specification.

My invention relates to improvements in machines for justifying type in which tapering or wedge-shaped space-bars are temporarily inserted during the composition crosswise of the line of type at such places as permanent type-spaces are required, such space-bars being thereafter driven progressively and successively by suitable automatic mechanism farther into the line to expand it finally to its full length as determined by limiting-stops in a traveling line-holder and removed successively from the line and replaced by permanent type-spaces of such individual and aggregate thickness as will properly space out and justify the line of type, which is thereupon automatically removed to a galley.

The invention herein shown and described is an improvement on the type-justifying machine heretofore invented by me and for which I have been granted United States Letters Patent No. 693,145, dated February 11, 1902, and No. 700,700, dated May 20, 1902.

In the former machine and generally in all other type-justifying machines wherein temporary spacing devices, commonly termed "spacers," are first inserted into the line and thereafter during the progress of justification removed and replaced by permanent spaces a plurality of line-holders or sticks have been used, arranged to circulate between the assembling means and the justifying means. This has been necessary in order that the two operations—*i. e.*, the composition of the line of type and temporary spacing devices by the operator and its automatic justification by the machine—may be carried on simultaneously and as nearly continuously as possible in order to secure a maximum output from the machine. This involves not only a duplication of parts, but also requires more or less complicated mechanism for causing the timely automatic circulatory movement of the line-holders or sticks.

The object of my invention is to do away with the necessity for the plurality of circulating sticks or line-carriers and to substitute therefor mechanism whereby the separately-composed lines with the spaces therein will be carried forward successively by a single transferring mechanism to the justifying devices and thence to the galley. To this end I employ a stationary raceway wherein the lines of type and spacing devices are assembled, a traveling carrier or line-holder, means for transferring the composed line to this holder, and means whereby the holder containing the line is advanced step by step past the justifying devices to the galley.

The invention in its preferred construction is shown in the accompanying four sheets of drawings, in which—

Figure 2:
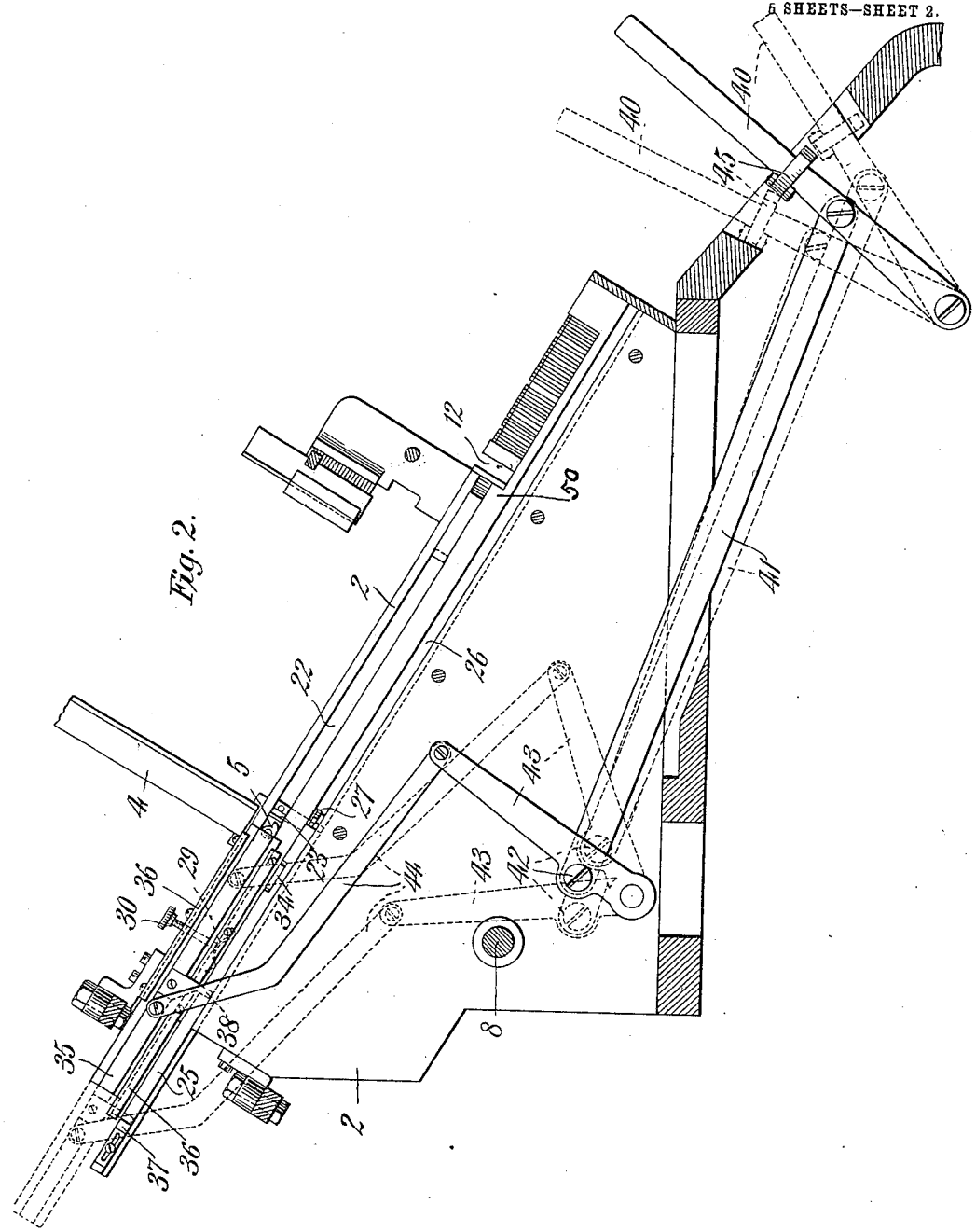
Figure 10:
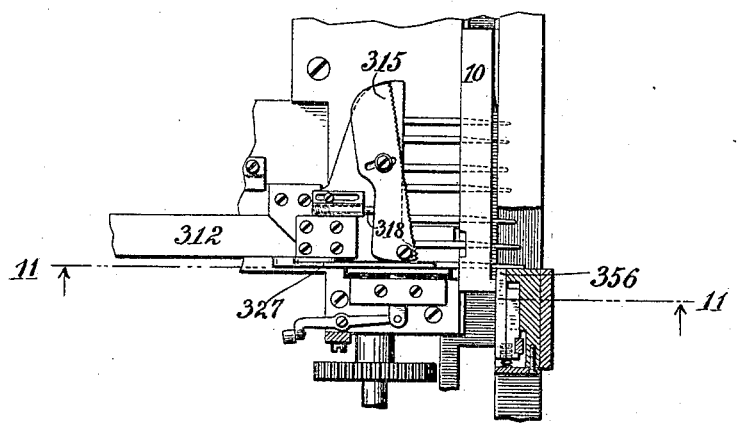
Figure 11:
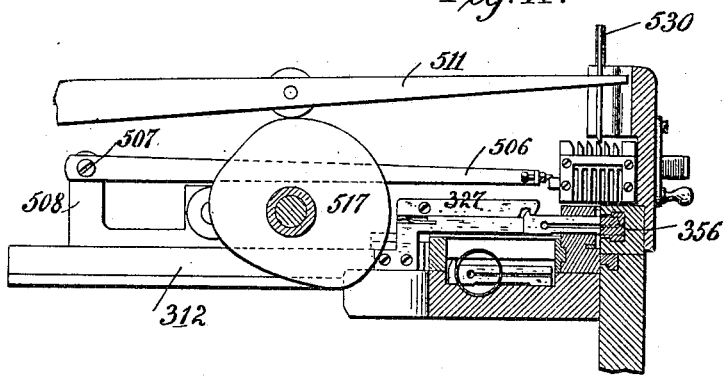

Figure 1 is a plan view of the entire machine, showing a line of type and space-bars partly assembled in the type-raceway. Fig. 2 is a side elevation of the entire side plate with the bed-plate and justifying mechanism removed. Figs. 3 and 4 are enlarged plan views, the first showing a line of type being moved down the raceway and the other showing the line of type in the reciprocating line-holder and with the line-stop withdrawn from its engagement with the line of type. Fig. 5 is an enlarged plan view of the reciprocating line-holder. Fig. 6 is a longitudinal sectional view through the type-raceway on the line A A of Fig. 8. Fig. 7 is an enlarged perspective view showing the detailed construction of the traveling line-stop and its connections. Fig. 8 is a cross-section on the line B B of Fig. 6. Fig. 9 is a cross-section on the line C C of Fig. 4. Fig. 10 is a plan view illustrating the justifying devices. Fig. 11 is a vertical cross-section of the same on the line 11 11 of the preceding figure.

Similar reference-numerals indicate similar parts in each of the views.

1 is the bed-plate of the justifying-machine, which is supported at a suitable angle by the side plate 2 on the right and on the left by an inclined ledge or shelf on the side frame 3 of the composing-machine.

4 is the lower end of a converging type-chute, whereby the types, when ejected from their several cases or channels by the manipulation of suitable controlling finger-keys, are guided in succession into the stationary type channel or raceway 20.

5 is the rotating type-cam by which the line of type and temporary space-bars are advanced along the raceway as they are assembled to form the line.

6 represents the wedge-shaped space-bars, which are stored at the upper end of a recess 7 in the bed-plate 1, whence they are elevated and inserted crosswise through the line of type, as required, by means of automatic mechanism caused to operate by the depression of a suitable space-key, as is shown and fully described in United States Letters Patent No. 700,700, to which reference may be made for detailed description.

8 is the main driving-shaft, which, by means of suitable gearing, rotates the justifying-shaft 9, which in turn actuates the several cams and devices which serve, first, by successive actions to drive the temporary space-bars the proper distance into the line of type contained in a reciprocating line-holder 10; second, to withdraw successively all of the temporary space-bars from the line and insert in lieu of each a permanent space, automatically selected from the proper channel of space-case 11, of the required thickness to properly space out and justify the line; and, third, when the line-holder 10 is moved to the open end of the galley 12 to deliver the justified line of type sidewise from the line-holder to the galley by means of the line-bunter 13.

The construction of the justifying mechanism and its mode of operation, briefly described above, (with the exception of the line-holder 10, which will be fully described later,) may be identical with that of the machine shown and fully described in United States Letters Patent No. 693,145, to which reference may be made for further description and details in the present machine.

A suitable fixed raceway or channel 20 is provided in which the line of type and wedge-spacers are first assembled instead of being assembled directly into a circulating line-holder as in the earlier machine. One wall of this type-raceway is formed by the side plate 2. The other wall of the raceway is partly formed by the bed-plate 1, which has a recess adjoining the side plate 2 to receive the feet of the type, while the upper part of this raceway-wall is formed by an L-shaped arm 21, the outer end of which is secured to the bed-plate 1. That portion of the arm 21 which is parallel with the side plate forms the upper part of the type-raceway, and the entire arm is sufficiently raised from the bed-plate to allow the space-bars to be inserted thereunder crosswise through the line of type with the thin end projecting beyond the type-line into the longitudinal slot 22 in the side plate in exactly the same manner they were formerly inserted into the circulating line-holder. This construction allows the space-bars to be moved freely with the line of type longitudinally down the raceway 20 into the grasp of the traveling line-holder 10. A traveling line stop or resistant 23 is secured to a base 24, which is pivoted at the point 18 to a bar 25, which slides freely along a groove 26 in the side plate 2. The line-stop proper, 23, extends normally through the space-bar slot 22 with its free end in the type-raceway, where it engages with and supports the foremost type of the line. As the line elongates in the course of composition it pushes the stop 23 forward.

The base 24 is normally retained in the position shown in Figs. 1, 2, and 3 by means of a pivoted latch 27; but upon the release of this latch, which is caused when its tail strikes an adjustable stop 14, the spring 28 immediately pulls the base outward to the position shown in Fig. 4, thereby withdrawing the line-stop 23 a sufficient distance to clear the type-line and the projecting ends of the space-bars while it is being returned to its initial position, as shown in Fig. 4. When in the retracted position, (shown in Fig. 4,) the end 34 of the stop-carrying base 24 projects out a sufficient distance to engage on its return movement with the tail 64 of the line-holder latch 66, thereby releasing the line-holder 10 and allowing it to start at once down its inclined track through the justifier mechanism. It is desirable that means be provided whereby the friction of the sliding bar 25, carrying the line-stop 23, may be readily adjusted. This is preferably done by means of a curved spring-clamp 29, Fig. 2, the pressure of which upon the bar 25 may be readily varied as desired by a thumb-screw 30. The pivoted base 24 is returned to its normal position to restore the line-stop at the proper time by means of a beveled block 31, which engages the downwardly-projecting lug 32, whereupon the latch 27 acts and retains it as before.

The details of the construction of the one justifying-line holder 10 which is used in the present machine are clearly shown in Figs. 5 and 6. It consists essentially of a rectangular steel block having on the side which adjoins the side plate 2 a rabbeted recess 69 of the same width and depth as the stationary type-raceway 20, in which the line is first assembled. A longitudinal slot 15 in the side of the line-holder, of the same width as the slot 22 in the side plate 2, extends the full length of the rabbeted line-recess 69. The lower part of the line-holder is for convenience made somewhat longer than the upper part in the present machine and preferably has its forward end beveled to fit under a similar bevel under the lower end of the type-raceway, as shown in Fig. 6. A pivoted latch 66 is provided, adapted to engage a notch 67 in the bottom of the line-holder and hold it securely against the lower end of the type-raceway 20, whereby the line-holder for the time being forms a continuation of said type-raceway, down which the assembled line of type and the space-bars may be readily moved by any suitable means. A rigid shoulder or abutment 61 at the front end of the line-holder and two pivoted stops 62 at the other end are provided for limiting the length of the line of type during the operation of justification. The pivoted stops or line-supports 62 are normally held in the position shown in Figs. 1 and 5 by means of light springs 63. As the line of type is moved down into the line-holder the foremost type engages with and forces the beveled part of the stops 62 out from the type-recess, as shown in Figs. 3 and 4, thereby allowing the line of type to pass freely into the line-holder, where the line is confined endwise between the shoulder 61 and the stops or dogs 62.

For the purpose of moving the assembled line of type and space-bars from the assembling raceway or channel 20 down into the grasp of the line-holder 10 a line-pusher slide 35 is provided, which may be moved longitudinally forward in the guides 36 a distance sufficient to move the line entirely into the line-holder with the last type clear of the pivoted stops or retaining-dogs 62. This slide 35 is cut out on the side toward the side plate, as shown in the sectional view in Fig. 9, so as to allow it to move freely down the line-raceway without interfering with the free revolution of the type-cam 5. In order to limit the length of the line during composition, an adjustable stop-block 37 is secured to the sliding bar 25 and adapted to engage with the lower end of the arm 38 on the line-pusher slide 35. The location of the stop-block 37 on the bar 25 and of the arm 38 on the slide 35 are such that when they are in engagement the distance between the front end of the line-pusher slide 35 and the line-stop 23 will exactly equal the length of the type-recess 69 in the line-holder 10, (see Fig. 5,) thereby making it impossible for the operator to "over-set"—that is, to set a longer line than can be taken into the line-holder between its limiting-stops.

In order that the operator may readily move the line-pusher slide 35 as required, a hand-lever 40 is provided, located beside the keyboard and connected to the slide 35 by means of the connecting-rod 41, secured at 42 to the lever 43. A second connecting-rod 44 has one end secured to the end of the lever 43 and the other end to the slide 35, as is clearly shown in Fig. 2, which shows the parts in their normal position ready for the operator to begin the composition of a line of type. A beveled latch 45 on the side of the lever 40 normally engages a beveled stop 46, and thus retains the lever in its normal position. When a line has been assembled in the type-raceway 20, the operator draws the lever forward to its extreme position, (shown by broken lines in Fig. 2,) thereby moving the line down out of the fixed channel or raceway 20 into the line-holder, as seen in Fig. 4, and he then immediately pushes the lever backward to its extreme position, as also shown by broken lines, thereby moving the line-pusher slide 35 a sufficient distance backward to return the sliding bar 25 and line-stop 23 to their initial position by reason of the engagement of the arm 38 with the stop 37. The lever 40 is then released by the operator and the line-pusher slide 35 and the lever 40 at once move forward by gravity, which may be assisted by a light spring, if desired, to the central normal position, where they are retained until another line is assembled in the type-raceway 20. When it is desired to set lines of another length, the length of the type-recess of the line-holder 10 may be readily shortened by securing therein a "slug" or block 68 of any required length, which thereafter forms the lower abutment, as shown by the broken lines in Figs. 5 and 6. At the same time the stop-block 37 on the slide should be moved forward a distance equal to the length of the slug used to reduce the available length of the line-holder in order to limit the length of the line during composition to equal the reduced length of the type-recess in the line-holder.

For the purpose of causing the line-holder 10, with the line of type and temporary space-bars contained therein, to move step by step, as required, down its track or raceway 50, so that the line may be automatically justified by progressively advancing the space-bars endwise through the line and by withdrawing the space-bars individually and substituting the final spacers, and the justified line thereafter removed to the galley 12 and immediately and quickly returning the empty line-holder to its initial position, the means shown in Fig. 1 is preferably used, the parts being shown in the initial or normal position in this figure.

A bell-crank lever is pivoted at 51 to the bed-plate 1. The long arm 52 of this lever is connected to the lower end of the line-holder 10 by a link 53. The reciprocating slide 47, which carries the line-bunter 13, is actuated by a connecting-rod 48, the outer end of which is secured to the slide 47, and the inner end is pivoted to the face of a disk 54, which is normally loose on the end of the justifier-shaft 9. The lever 55, when engaged by the lower end of the line-holder, serves to cause the usual clutch to lock the disk 54 to the justifier-shaft 9 during one entire revolution in exactly the same manner as in the Patent No. 693,145, last referred to. A bracket 56 is secured to the reciprocating slide 47 and has a spring-bunter 58, which is adapted to engage the short arm 59 of the bell-crank lever during a portion of the outward movement of said slide. The length of the spring-bunter may be varied at will by means of the nuts 57 on its end. A spring 60 may be secured to the rear arm of the lever 52 to assist the downward movement of the line-holder 10, making its movement along the track or raceway 50 more certain and prompt than if effected by gravity alone. The movement of the line-holder along the track or raceway 50 is not continuous, but proceeds step by step, as in the former machine, the movement being arrested whenever a wedge spacer or space-bar 6 engages the usual fixed stop until the spacer has been withdrawn from the type-line and replaced by a final space of suitable thickness. The bunting or driving mechanism for advancing the wedge-spacers endwise through the line and for removing them successively from the line and replacing them by the final spaces is indicated in a general way in Fig. 1, the construction and mode of operation being essentially the same as shown and described in Patent No. 635,886.

The operation of the machine is as follows: The operator assembles the required type characters and the temporary space-bars in the stationary raceway 20 by the proper manipulation of finger-keys. (Shown in Fig. 1.) When he has thus assembled a full line, which is determined by the maximum distance between the line-stop 23 and the lower end of the line pusher-slide 35, he pulls forward the lever 40, thereby moving the line bodily down into line-holder 10, and then immediately moves it to its full limit backward, which automatically releases the line-holder catch 66 and returns the parts to their normal position, allowing him to immediately begin the composition of another line. The line-holder after being released moves step by step along its track, where the automatic justification of the line is effected. The advancing of the line-holder, containing the type and the spacers, is repeatedly checked by the contact of the successive spacers with the usual fixed stop (shown at 375 in Patent No. 693,145) in order that the spacers may be acted upon with the driver or bunter and later by the device for extracting them, one at a time, from the line. The mechanism for effecting the automatic justification and spacing of the line of type contained in the line-holder may be of the same, or essentially the same, construction as that represented in Patent No. 693,145. The principal details are shown in Figs. 10 and 11, the various parts being indicated by the same numbers as the corresponding parts in said patent, 315 representing the yielding bunter-plate connected by a horizontal pivot to the end of the slide 312, so that as the bunter advances it will act upon the rear ends of the wedge-spacers and drive them forward through the line. The bunter-plate is urged forward by a spring-actuated plunger 318, so that it may yield to a limited extent under the resistance offered by the wedges. 327 is the reciprocating bar, having a hooked forward end to engage with the hooks on the extremities of the successive space-bars in order to withdraw them, one after another, from the line. As the holder advances it is arrested from time to time by the contact of the successive spacers with the stop 356. While the line-holder is thus held at rest the foremost spacer is retracted by the hooked arm 327; but previous to the retraction a final space of suitable width is inserted into the line above the wedge by the overlying vertical blade 530, which is guided in the main frame and actuated by the vertical lever 511, which is lifted by a cam 517 and depressed by a spring or other means. The final spaces of various thicknesses are carried in the parallel channels of the space-galley 11, mounted to swing around an upright pivot 37. This galley is urged to the left by a weighted cord 522 and is urged in the opposite direction in order to bring a space of the ordinary width below the pusher 530 by a space-selecting lever 506, pivoted at 507 to a bracket 508 on the justifying-slide 312. The space-selecting lever pushes the space rack or galley 11 to the required distance to bring the channel containing the spaces of the proper thickness directly over the line of type in the line-holder. As the space-selecting lever is carried on the same slide which actuates the bunter or driver 325 of the space bars or wedges, it is obvious that the space-galley will be moved forward according to the distance which the foremost space-bar is driven through the line by the driver 325. The final space is first entered above the wedge or space-bar, the latter then withdrawn, and then the final space driven home to its place in the line. The line-holder and line are then advanced until the next space-bar assumes the position previously occupied by the one withdrawn, when the action is repeated, and so on continuously. When the line-holder arrives at the lower end of its travel, (shown by the broken lines in Fig. 1,) it engages the end of the lever 55, and thereby causes the disk 54 to become locked to the justifier-shaft during one complete revolution in the direction of the arrow. This causes the slide 47 to move first toward the right a sufficient distance for the bunter 13 to move the line of type out of the type-recess of the line-holder into the galley. During the return movement of the slide 47 the end of the spring-bunter 58 engages the short arm 59 of the bell-crank lever and moves it quickly outward such distance as is required to return the line-holder up along its track to its initial position, where it is retained by the latch 66 until another line of type is transferred into it. It will be observed that the single line-holder 10, moving to and fro between the delivery end of the assembling-channel and the end of the receiving-galley, serves not only to transport the type and the spacers, but also to present the spacers repeatedly to the action of the driver or bunter and successively to the retracting device, and, further, to limit the length to which the line is justified, and, finally, to present the justified line in position for delivery to the galley.

What I claim as my invention is—

1. In a type-justifying mechanism, the combination of a fixed raceway, wedge-spacers, means for assembling a line of type and spacers in the raceway, a galley to receive the justified line of type, a line-holder arranged to reciprocate between the raceway and the galley and adapted to control the length of the justified line, means for transferring the composed line from the raceway to the line-holder, and justifying mechanism to coöperate with the spacers during the advance of the line-holder.

2. In a type-justifying mechanism, the combination of a fixed raceway, wedge-spacers, means for assembling type and spacers in the raceway, a reciprocating line-carrier adapted to admit the composed line from the raceway and to limit the length of the justified line, means for shifting the composed line from the raceway into the carrier, means coöperating with the spacers to repeatedly arrest the advance of the carrier and justify the line, means for removing the justified line from the carrier, and means for returning the line-carrier through its original path to the raceway.

3. In a type-justifying mechanism, a fixed raceway, wedge-spacers, and means for assembling the spacers and type in the raceway, in combination with a yielding resistant for the type-line, means for effecting the removal of the resistant from the path of the line, means for advancing the line past the resistant, a reciprocating line-carrier arranged to receive the composed line from the raceway and adapted to limit the length of the justified line, means for thereafter causing the advance of the carrier, justifying mechanism to coöperate with the type and spacers in the advancing carrier, and means for returning the carrier subsequent to justification to the raceway.

4. In a type-justifying mechanism, a raceway and a reciprocating line-carrier, both inclined, and the latter adapted to limit the length of the justified line, in combination with means to assemble type and wedge-spacers in the raceway, a resistant movable in advance of the line during its composition and also movable from the path of the line, means for pushing the line from the raceway to the carrier, means for holding the carrier during the transfer of the line thereto, and thereafter releasing it that it may move endwise with the line, means for arresting the carrier repeatedly during its advance, means for advancing the spacers through the line and thereafter removing them therefrom, and means for restoring the resistant, the line-pusher and the carrier to their original positions.

5. In a justifying mechanism, a raceway and means for assembling lines of type and wedge-spacers therein, a traveling stop or resistant to act against the front of the line in the raceway, a reciprocating line-carrier provided with a rigid shoulder to sustain the forward end of the type-line, and a movable stop or shoulder to support the rear end of the line, means for advancing the line from the raceway into the carrier, justifying devices, means for advancing the carrier and the contained line past the justifying mechanism, and means for restoring the traveling resistant and the carrier to their original positions.

6. In a justifying mechanism, a raceway, wedge-spacers, means for assembling type and spacers in line in the raceway, a traveling resistant to support the forward end of the line in the raceway, a pusher acting behind the line to carry the same out of the raceway, a reciprocating line-carrier arranged to receive the line from the raceway and provided with means for limiting the length of the line during justification, and mechanism in the path of the carrier to adjust the spacers, insert type-spaces and withdraw the spacers, substantially as described.

7. In a justifying mechanism, means for assembling type and temporary wedge-spacers in line, in combination with means for adjusting and withdrawing the spacers and substituting final spaces therefor, an intermediate reciprocating line-carrier provided with means to limit the elongation of the line by justification, and means for delivering the line into said carrier and for advancing the carrier past the justifying devices.

8. In a justifying mechanism, a raceway, and means for assembling type and temporary wedge-spacers in line therein, a gravitating line-carrier mounted on an inclined guide and provided with means to limit the elongation of the line therein by justification, means for transferring the composed line to the carrier, means for holding the carrier in place to receive the composed line from the raceway, means for thereafter releasing the holder that it may descend by gravity, means for actuating the wedge-spacers during the advance of the carrier to effect justification, and means for limiting the advance of the carrier step by step during the justifying action.

9. The combination of a raceway, wedge-spacers, and means for assembling the spacers and type in line in said raceway, a traveling stop to act against the forward end of the line, and a pusher to act against the rear end of the line, said stop and pusher arranged, substantially as described, to limit the length of the composed line.

10. In a justifying mechanism, means for composing type and wedge-spacers in line, mechanism for adjusting and withdrawing the spacers and substituting final spaces, an intermediate reciprocating line-carrier, means for transferring the previously-composed line to the carrier, and movable means in the carrier for confining the line and limiting its elongation therein.

11. In a justifying mechanism, the combination of wedge-spacers, means for assembling type and spacers in line, a reciprocating line-carrier provided with means to limit the elongation of the line therein, means for transferring the previously-composed line to said carrier, justifying devices adapted to adjust and remove the spacers and insert the final spaces, a receiving-galley, means for directing the line-carrier from the composing mechanism step by step past the justifying devices to the galley, and means for delivering the justified line sidewise from the carrier to the galley.

12. The combination with means for assembling a line of type and temporary space-bars in a stationary raceway, of a line-stop to engage the forward end of the line during its composition and subsequent longitudinal travel along the raceway, a traveling line-holder means for withdrawing the line-stop from its engagement with the line, a line-pusher slide for moving the composed line along the raceway into the line-holder, suitable stops for limiting relative movements of the line-stop and line-pusher slide, and a hand-lever connected to the line-pusher slide for conveniently and quickly moving the line from the stationary raceway into the line-holder, and returning the parts to their initial position.

13. A line-stop secured to a suitable base-block which is pivoted to a longitudinal sliding bar, a latch for normally retaining the line-stop in the type-raceway, a lug adapted to engage the release said latch, a spring for withdrawing the line-stop clear of the raceway and causing a lug to project outward from the face of the sliding bar, and a cam-block secured to the side plate and adapted to engage a lug on the base-block and return it to its normal latched position.

14. The combination with means for assembling a line of type and temporary space-bars, of a traveling line-holder with limiting-abutments adapted to receive and hold said line, means for removing the temporary space-bars and substituting permanent spaces, a track or way for the line-holder to travel on between the justifying means and the type-receiving galley, a spring-actuated lever connected to the line-holder for causing the required intermittent movement during justification and thence its further movement to the galley, and means for quickly returning the said actuated lever and the empty line-holder to their initial position.

15. The combination with means for assembling a line of type and temporary space-bars, of a traveling line-holder with limiting-abutments adapted to receive and hold said line, means for removing the temporary space-bars and substituting spaces, a track or way for the line-holder to travel on between the justifying means and the type-receiving galley, a spring-actuated lever connected to the line-holder for causing the required intermittent movement during justification and thence its further movement to the galley, a line-bunter for removing the justified line of type to the galley, a stud secured to the line-bunter slide in such position as to engage a short arm on the line-holder-actuating lever and thereby return the line-holder quickly to its initial position the instant the line-bunter is withdrawn from engagement therewith.

16. The combination with means for assembling a line of type and temporary space-bars, of a traveling line-holder with limiting-abutments adapted to receive and hold said line, means for removing the temporary space-bars and substituting permanent spaces, a track or way for the line-holder to travel on between the justifying means and the type-receiving galley, a spring-actuated lever connected to the line-holder for causing the required intermittent movement during justification and thence to the galley, a line-bunter for removing the justified line of type to a galley an adjustable stud with a spring-relief secured to the line-bunter slide in such position as to engage a short arm on the line-holder-actuating lever and thereby return the line-holder quickly to its initial position the instant the line-bunter is withdrawn from engagement therewith.

Signed at New York, in the county of New York and State of New York, this 9th day of February, A. D. 1904.

FRANK McCLINTOCK.

Witnesses:
GEORGE E. BRADY,
WM. A. BLUEDEL, Jr.